Patented Mar. 9, 1948

2,437,561

UNITED STATES PATENT OFFICE 2,437,561

PREPARATION FOR THE CARE OF THE SKIN

Fritz Schaaf, Basel, Switzerland, assignor to Ciba Pharmaceutical Products Inc., Summit, N. J., a corporation of New Jersey No Drawing. Application March 9, 1945, Serial No. 581,970. In Switzerland January 3, 1944

Section 1, Public Law 690, August 8, 1946
Patent expires January 3, 1964

2 Claims. (Cl. 167—90)

The care of the skin by means of cosmetics follows the aim of preserving the skin in its normal condition. Numerous preparations are known which are intended to serve this purpose. Those which contain substances having a vitamin F action are considered to be particularly suitable, a fact which has also been demonstrated experimentally [F. Grandel, "Fette und Seifen," 46, 151, (1939)]. Such preparations are generally used in the form of liquid or semi-liquid emulsions. The specific component is generally mainly dissolved in the fatty phase.

It has now been found that a particularly satisfactory preparation for the care of the skin can be obtained by adding substances with a vitamin F effect plus nicotinamide to the usual preparations. In this way a definite effect can be produced with considerably smaller quantities of the substances having a vitamin F effect, than if these substances are used without nicotinamide. The simultaneous addition of emulsifying agents also proved to be advantageous.

Amongst the substances possessing a vitamin F effect may be mentioned: multi-unsaturated fatty acids and their esters or natural products containing same, e. g., linoleic acid, its esters, sunflower oil, nut oil, poppy oil, etc.

The preparations for the care of the skin can be used in the form of creamy or liquid emulsions.

*Example 1*

| | Parts by weight |
|---|---|
| Stearic acid | 22.0 |
| Sunflower oil | 5.0 |
| Anhydrous wool-fat | 2.2 |
| Purified cetyl alcohol | 0.6 |
| p-Hydroxybenzoic-acid-methyl-ester | 0.2 | are melted on a water-bath at 90° C. until a clear mass is obtained and then emulsified with a mixture at the same temperature consisting of

| | Parts by weight |
|---|---|
| Glycerine | 8.0 |
| A 0.1 percent. nicotinamide solution in water | 6.0 |
| A sodium salt of a sulfonic acid which is derived from a μ-substituted benzimidazole alkylated at the nitrogen atom and whose substituent contains 9–16 carbon atoms | 0.25 |
| Triethanolamine | 1.2 |
| Distilled water | 54.05 |

After stirring until cold, 0.5 part by weight of an aromatic mixture is added.

In this way a preparation for the care of the skin, which can be used in the form of a face-cream, is obtained.

In the above example 2.5 parts by weight of linoleic acid could be used instead of 5.0 parts by weight of sunflower-oil.

*Example 2*

Triethanolamine-stearate and triethanol-aminoleate are freshly prepared from

| | Parts by weight |
|---|---|
| Oleic acid | 1.0 |
| Stearic acid | 3.0 |
| Triethanolamine | 1.8 | and dissolved warm in

| | Parts by weight |
|---|---|
| Paraffin oil | 5 |
| Sweet almond oil | 10.0 |
| Nut oil | 10.0 |
| Purified cetyl alcohol | 0.5 |
| p-Hydroxybenzoic-acid-methylester | 0.2 | are added to this solution, the whole heated on a water-bath until homogeneously mixed, then stirred until the temperature has fallen to 45° C., and 0.3 part by weight of aromatic mixture added.

A solution containing

| | Parts by weight |
|---|---|
| A sodium salt of a sulfonic acid which is derived from a μ-substituted benzimidazole alkylated at the nitrogen atom and whose substituent contains 9 to 16 carbon atoms | 0.5 |
| A 0.1 percent. nicotinamide solution in water | 18.0 |
| Distilled water | 49.7 | which had been warmed to 45° C. is added in small portions, shaking continually, and emulsified until the mixture has reached room temperature. In this way a preparation for the care of the skin, which can be used in the form of a "face-milk" is obtained.

What I claim is:

1. A cosmetic preparation for the care of the skin containing sunflower oil plus nicotinamide.

2. A cosmetic preparation for the care of the skin containing a member selected from the group consisting of the naturally-occurring multi-unsaturated fatty acids and their naturally-occurring esters, plus nicotinamide.

FRITZ SCHAAF.

REFERENCES CITED

The following references are of record in the file of this patent:

UNITED STATES PATENTS

| Number | Name | Date |
|---|---|---|
| 2,036,525 | Granacher | Apr. 7, 1936 |

OTHER REFERENCES

Goodman, Cosmetic Dermatology (1936), pp. 554, 560.

Grandel, A. P. C. Publication Ser. No. 275,543, pub. May 11, 1943 (167-81 box 14).

Journal of the American Medical Association, Jan. 27, 1945, page 246 (167-81 box 14). (Copy in Sci. Lib.)

De Navarre, Chemistry and Manufacture of Cosmetics (1941), pages 656, 657. (Copy in Div. 43.)

Eller et al., Journal of the American Medical Association, vol. 114, page 2003, May 18, 1940, 167-81 box 14. (Copy in Sci. Lib.)

U. S. Dispensatory, 23d ed. (1943), page 1391. (Copy in Div. 43.)

Certificate of Correction

Patent No. 2,437,561.　　　　　　　　　　　　　　　　　　　　　　　　March 9, 1948.

FRITZ SCHAAF

It is hereby certified that errors appear in the printed specification of the above numbered patent requiring correction as follows: Column 2, line 18, Example 2, after "warm in" insert the words and period *5 parts by weight of paraffin oil.*; line 20, strike out "Paraffin oil ............... 5"; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*